3,162,591
SYNTHESIS OF AMINO ACIDS BY HIGH
INTENSITY IONIZING RADIATION
Torsten Hasselstrom, 33 Delmar Ave., Framingham,
Mass., and Malcolm C. Henry, E. Slough Road,
Harvard, Mass.
No Drawing. Filed Oct. 10, 1957, Ser. No. 689,434
16 Claims. (Cl. 204—154)
(Granted under Title 35, U.S. Code (1952), sec. 266)

The invention described herein, if patented, may be manufactured and used by or for the Government for governmental purposes, without the payment to us of any royalty thereon.

Our invention relates to the synthesis of amino acids by subjecting ammonium acetate to high intensity ionizing radiation. More particularly, our invention contemplates the production of selected mono- and dicarboxylic amino acids by subjecting an aqueous solution of ammonium acetate to a controlled discharge of high-speed beta rays or gamma rays, whereby a molecular rearrangement is caused to take place, and at least part of the reaction product is converted to diamino dicarboxylic acids, such as aspartic acid and diaminosuccinic acid.

In our copending patent application Serial Number 564,327, filed February 8, 1956, now Patent No. 2,886,-501, dated May 12, 1959, we have disclosed a process of converting an inorganic carbonate or bicarbonate to oxalic acid by means of high intensity ionizing radiation. We have now found that ammonium acetate undergoes a molecular rearrangement and conversion to amino acids when subjected to similar conditions. This is an economically important observation inasmuch as ammonium acetate is an inexpensive industrial chemical which can be cheaply mass-produced, e.g., by reacting acetic acid and ammonia. Its conversion into amino acids, by means of ionizing radiation is particularly interesting, particularly in the case of the dicarboxylic amino acids.

We postulate that high intensity ionizing radiation, such as gamma radiation, or preferably a stream of high-speed beta rays such as that produced by a 2 million electron volt 500 watt Van de Graaff electron accelerator, causes the ammonium ions of an aqueous solution of ammonium acetate to dissociate into free $NH_2$, $H$, and $OH$ groups which rearrange themselves about the acetic acid residue to form a mixture of glycine (aminoacetic acid), aspartic acid (monoaminosuccinic acid), and diaminosuccinic acid. This mixture can be separated into its components by conventional methods, such as dialysis.

The ammonium salts of the above-named amino acids are probably first formed in solution as intermediate products of the irradiation, but hydrolyze instantaneously in solution to the corresponding amino acids.

There are also formed non-amino polycarboxylic acids (such as succinic, malonic, citric, and tri-carballylic acids) as by-products of this reaction; they can be separated from the amino acids by conventional procedures such as washing with ammonium hydroxide solution.

The following examples illustrate the practice of our invention, but are not intended to limit the scope of our invention to specific details.

*Example I*

200 ml. samples of a 1% solution of ammonium acetate were subjected to absorption of various dosages of beta radiation by means of a 2 million electron volt Van de Graaff electron accelerator. The following quantities of amino acids were recovered:

| Dosage (Million Roentgen Equivalent Physical Units) | Quantity of Amino Acids ($\mu$g.) | | |
|---|---|---|---|
| | Glycine | Aspartic Acid | Diaminosuccinic Acid |
| 20 | 672 | 422 | 125 |
| 30 | 1,030 | 940 | 361 |
| 50 | 1,720 | 1,850 | 1,079 |

*Example II*

Example I was repeated with a 2.5% aqueous solution of ammonium acetate. The following quantities of amino acids were recovered:

| Dosage (Million Roentgen Equivalent Physical Units) | Quantity of Amino Acids ($\mu$g.) | | |
|---|---|---|---|
| | Glycine | Aspartic Acid | Diaminosuccinic Acid |
| 10 | 33 | 23 | |
| 20 | 658 | 266 | |
| 30 | 1,400 | 985 | 360 |
| 50 | 2,200 | 1,872 | 550 |

It will be seen from the foregoing examples that, with the concentrations of ammonium acetate solutions as shown, glycine and aspartic acid begin to form at dosage rates of about 10,000,000 roentgen equivalent physical units, and diaminosuccinic acid begins to form at a dosage rate of about 20,000,000 roentgen equivalent physical units. The yields increase with increased dosages; thus, in the case of the production of diaminosuccinic acid from a 1%-solution of ammonium acetate of 50 megareps (million roentgen equivalent physical units), the yield is more than 8½ times the yield of diaminosuccinic acid obtained at a dosage of 20 megareps. If gamma radiation is used in lieu of beta rays, radioactive isotopes, such as cobalt[60], or radioactive atomic fission products may be used, provided proper precautions are taken to protect the operating personnel, such as lead shielding.

When our invention is practiced in the form of a batch process, we have found it convenient to inclose samples of ammonium acetate solutions in heat-sealed polyethylene bags or "Mylar" (polyethylene terephthalate) bags. Other radiation-transmissive containers, such as glass or transparent plastic bottles or tubes may be substituted.

Van de Graaff electron accelerators are available in a number of types at various operating voltages and power outputs, beginning with 1,000,000 electron volts and 25 watts (Type JD); other types have operating voltages and power outputs of 2,000,000 electron volts and 500 watts (Type AD), and 3,000,000 electron volts and 12,000 watts (Type FD). All of them are capable of delivering effective dosages of ionizing radiation for the practice of our invention.

When our process is practiced as a continuous process, the ammonium acetate aqueous solution is circulated (e.g., through a glass or plastic tube) into exposure to high intensity ionizing radiation by a controlled slow passage into and out of the proximity of a high-intensity radiation source, such as a high voltage high speed electron generator or a highly radioactive isotope (e.g., Co⁶⁰), until a partial conversion to mono- and dicarboxylic amino acids has been obtained at the predetermined dosage rate. The amino acids are then separated in the manner described, and the unreacted ammonium acetate residue is recombined with fresh ammonium acetate solution and recirculated to the source of high intensity ionizing radiation.

It will thus be clear from the foregoing description of the principles of our invention that we have provided a high intensity ionizing radiation process for converting ammonium acetate into a number of amino acids, including dicarboxylic amino acids, such as aspartic acid and diaminosuccinic acid. Although we have illustrated and described the preferred form of our invention, it will be obvious that various changes may be made therein without departing from the spirit of the invention or from the scope of the subjoined claims.

We claim:

1. A process of converting ammonium acetate into amino acids, comprising subjecting an aqueous solution of ammonium acetate to high intensity ionizing radiation equivalent to at least about 1,000,000 electron volts, until a dosage of at least about 10,000,000 roentgen equivalent physical units has been absorbed and at least a substantial portion of said ammonium acetate is converted into a mixture of amino acids, and separating said mixture into discrete portions of glycine, aspartic acid, and diaminosuccinic acid.

2. Process according to claim 1, wherein the dosage of said ionizing radation is at least about 20,000,000 roentgen equivalent physical units.

3. Process according to claim 1, wherein said source of said ionizing radiation is a high voltage high speed electron generator.

4. Method of converting ammonium acetate into a dicarboxylic amino acid, comprising subjecting an aqueous solution of ammonium acetate to high intensity ionizing radiation equivalent to at least about 1,000,000 electron volts, until a dosage of at least about 10,000,000 roentgen equivalent physical units has been absorbed and at least a substantial portion of said ammonium acetate is converted into a mixture of amino acids including a dicarboxylic amino acid, and separating said dicarboxylic amino acid from said mixture.

5. Process according to claim 4, wherein the dosage of said ionizing radiation is at least about 20,000,000 roentgen equivalent physical units.

6. Process of converting ammonium acetate into glycine, comprising subjecting an aqueous solution of ammonium acetate to high intensity ionizing radiation equivalent to at least about 1,000,000 electron volts, until a dosage of at least about 10,000,000 roentgen equivalent physical units has been absorbed and at least a substantial portion of said ammonium acetate is converted into a mixture of amino acids including glycine, and separating said glycine from said mixture.

7. Process of converting ammonium acetate into aspartic acid, comprising subjecting an aqueous solution of ammonium acetate to high intensity ionizing radiation equivalent to at least about 1,000,000 electron volts, until a dosage of at least about 10,000,000 roentgen equivalent physical units has been absorbed and at least a substantial portion of said ammonium acetate is converted into a mixture of amino acids including aspartic acid, and separating said aspartic acid from said mixture.

8. Process of converting ammonium acetate into diaminosuccinic acid, comprising subjecting an aqueous solution of ammonium acetate to high intensity ionizing radiation equivalent to at least about 1,000,000 electron volts, until a dosage of at least about 10,000,000 roentgen equivalent physical units has been absorbed and at least a substantial portion of said ammonium acetate is converted into a mixture of amino acids including diaminosuccinic acid, and separating said diaminosuccinic acid from said mixture.

9. Process according to claim 8, wherein the dosage of said ionizing radiation is at least about 20,000,000 roentgen equivalent physical units.

10. Process according to claim 1, wherein said high intensity ionizing radiation is a stream of beta rays.

11. Process according to claim 1, wherein said high intensity ionizing radiation is gamma radiation.

12. A continuous process of converting ammonium acetate into amino acids, comprising subjecting an aqueous solution of ammonium acetate to high intensity ionizing radiation equivalent to at least about 1,000,000 electron volts, until a dosage of at least about 10,000,000 roentgen equivalent physical units has been absorbed and a substantial portion of said ammonium acetate is converted into a mixture of amino acids, separating said mixture of amino acids, and recirculating unreacted ammonium acetate solution together with a fresh amount of aqueous ammonium acetate solution to said source of high intensity ionizing radiation.

13. Process according to claim 12, wherein said high intensity ionizing radiation is a stream of high-speed beta rays.

14. Process according to claim 1, wherein said high intensity ionizing radiation is a stream of high-speed beta rays emanating from an electron accelerator of at least about 1,000,000 electron volt capacity.

15. A process for converting ammonium acetate into amino acids which comprises, irradiating ammonium acetate with ionizing radiation equivalent to at least about one million electron volts until a dosage of at least about $10 \times 10^6$ roentgen equivalent physical units has been absorbed, and subsequently recovering amino acids from the irradiated material.

16. A process for converting ammonium acetate into amino acids which comprises, irradiating ammonium acetate with ionizing radiation equivalent to at least about one million electron volts until a dosage of at least about $20 \times 10^6$ roentgen equivalent physical units has been absorbed, and subsequently recovering amino acids from the irradiated material.

No references cited.

WINSTON A. DOUGLAS, *Primary Examiner.*

JOHN R. SPECK, JOSEPH REBOLD, *Examiners.*